(12) United States Patent
Narasimha et al.

(10) Patent No.: US 12,256,264 B2
(45) Date of Patent: *Mar. 18, 2025

(54) LATENCY MANAGEMENT FOR INTEGRATED ACCESS AND BACKHAUL

(71) Applicant: APPLE INC., Cupertino, CA (US)

(72) Inventors: Murali Narasimha, Lake Oswego, CA (US); Bharat Shrestha, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,754

(22) Filed: Jan. 26, 2024

(65) Prior Publication Data

US 2024/0163717 A1 May 16, 2024

Related U.S. Application Data

(63) Continuation of application No. 17/285,386, filed as application No. PCT/US2019/056598 on Oct. 16, 2019, now Pat. No. 11,924,675.

(60) Provisional application No. 62/747,579, filed on Oct. 18, 2018.

(51) Int. Cl.
*H04W 28/02* (2009.01)
*H04W 72/20* (2023.01)
*H04W 72/23* (2023.01)
*H04W 92/20* (2009.01)

(52) U.S. Cl.
CPC ....... *H04W 28/0278* (2013.01); *H04W 72/20* (2023.01); *H04W 72/23* (2023.01); *H04W 92/20* (2013.01)

(58) Field of Classification Search
CPC . H04W 28/0278; H04W 72/20; H04W 72/23; H04W 92/20
See application file for complete search history.

(56) References Cited

U.S. PATENT DOCUMENTS

| 2013/0003650 | A1 | 1/2013 | Han et al. |
| 2015/0043547 | A1 | 2/2015 | Pelletier et al. |
| 2017/0353819 | A1* | 12/2017 | Yin ......................... H04L 47/30 |

(Continued)

FOREIGN PATENT DOCUMENTS

JP 2013522976 A1 6/2013

OTHER PUBLICATIONS

Ericsson, et al.,"Uplink Scheduling in IAB Networks, R2-1814365, 3GPP TSG-RAN WG2 Meeting #103b, Chengdu, P. R. China, Agenda 11.1.2", Oct. 8-12, 2018,5 pages.

(Continued)

*Primary Examiner* — John D Blanton
(74) *Attorney, Agent, or Firm* — Dorsey & Whitney LLP

(57) ABSTRACT

Technology for an Integrated Access and Backhaul (IAB) node in an IAB network is disclosed. The IAB node can decode, at a distributed unit (DU) of the IAB node, a first resource request received from one of a user equipment (UE) or a child IAB node, wherein the first resource request is associated with the UE. The IAB node can encode, at a mobile terminal (MT) of the IAB node, a second resource request for transmission to the parent IAB node or the IAB donor triggered by receipt of the first resource request, wherein the second resource request is transmitted prior to a receipt of a protocol data unit (PDU) at the DU of the IAB node.

15 Claims, 15 Drawing Sheets

(56) References Cited

U.S. PATENT DOCUMENTS

2019/0357247 A1* 11/2019 Keskitalo .............. H04W 72/21
2021/0168645 A1*  6/2021 Adjakple .............. H04W 72/54
2021/0345369 A1* 11/2021 Teyeb ............... H04W 28/0278

OTHER PUBLICATIONS

Huawei, Hisilicon, et al.,"Pre-BSR Enabling Fast Scheduling, R2-1815504 (Revision of R2-1812881) 3GPP TSG-RAN WG2 Meeting 103bis, Chengdu, China, Agenda 11.1.2", Oct. 8-12, 2018, 3 pages.
Intel Corporation, et al.,"Control Plane Latency in IAB networks, R2-1814487, 3GPP TSG RAN WG2 Meeting #103bis, Chengdu, China, Agenda Item 11.1.3", Oct. 8-12, 2018, 4 pages.
PCT/US2019/056598, et al., International Search Report and Written Opinion, Feb. 5, 2021, 12 pages.
Sony, et al.,"Resource allocation in IAB, R2-1814733 (Resubmission of R2-1811417), 3GPP TSG RAN WG2 Meeting #103bis, Chengdu, China, Agenda 11.1.2", Oct. 8-12, 2018, 3 pages.
LG Electronics Inc., "Scheduling enhancement in IAB", R2-181xxxx (resubmission of R2-1812638) 3GPP TSG-RAN WG2 Meeting #103bis, Chengdu, China, Agenda Item 11.1.2 (FS_NR_IAB), Oct. 8-12, 2018, 2 pages.
U.S. Appl. No. 17/285,386, Non-Final Office Action, May 5, 2023, 10 pages.
U.S. Appl. No. 17/285,386, Notice of Allowance, Nov. 29, 2023, 9 pages.

* cited by examiner

LATENCY MANAGEMENT FOR INTEGRATED ACCESS AND BACKHAUL

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
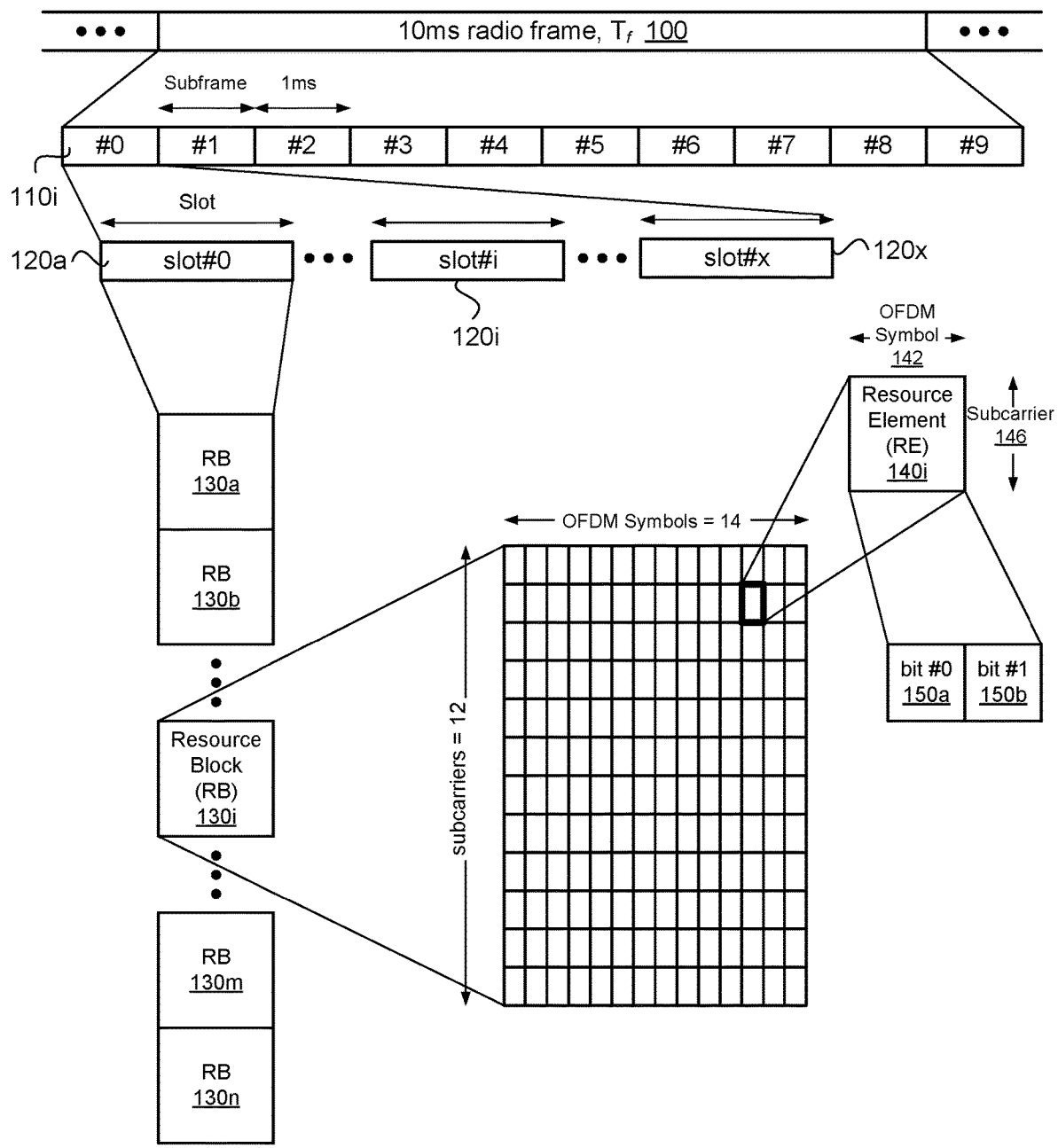
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μms, where p=1 for 15 kHz subcarrier spacing, µ=2 for 30 kHz, µ=4 for 60 kHz, µ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Figure 2:
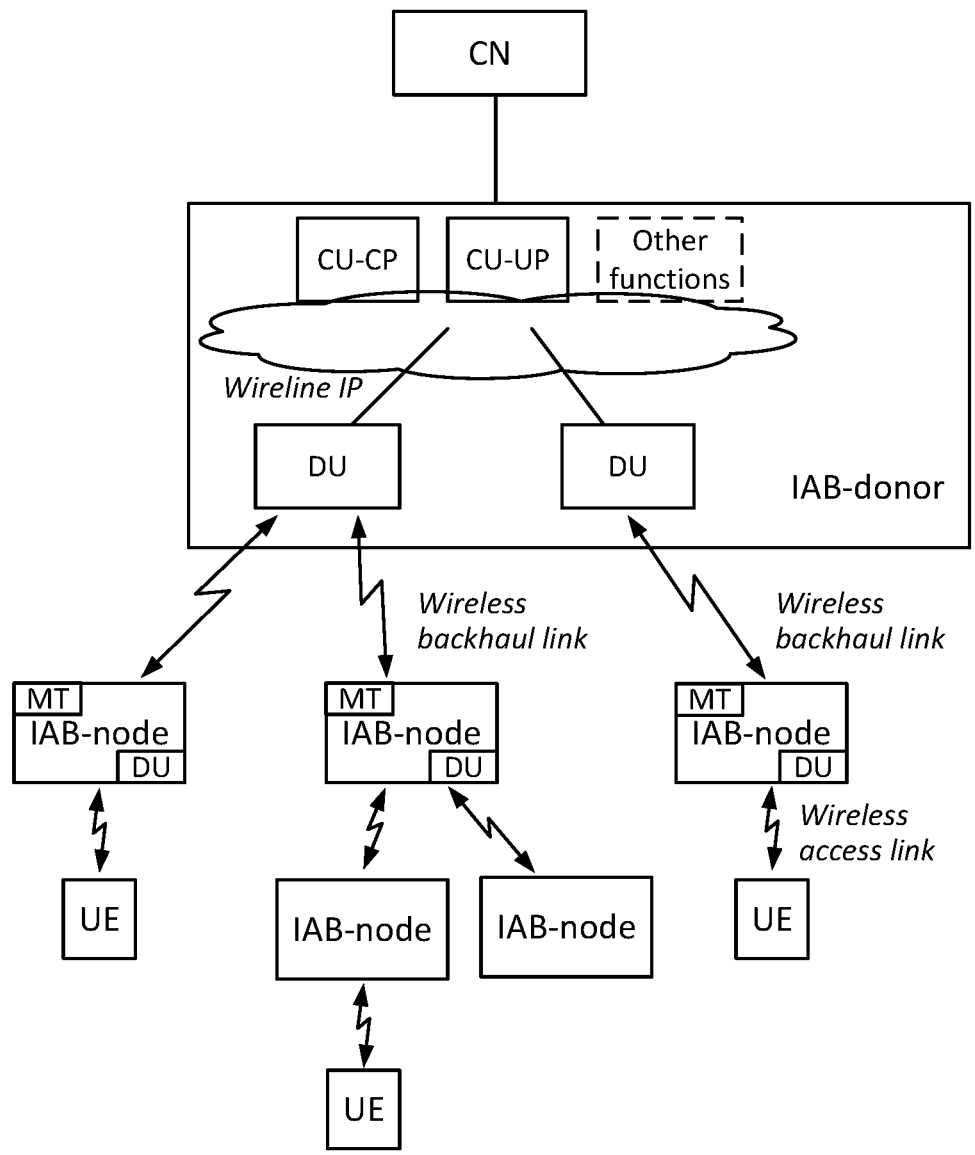
FIG. 2 illustrates an integrated access and backhaul (IAB) network architecture in accordance with an example.

FIG. 2 illustrates an example of an IAB network architecture. An IAB network can include a core network (CN). An IAB donor (or IAB donor node) can communicate with the CN, and IAB node(s) can communicate with the IAB donor. A central unit (CU)/distributed unit (DU) split can be leveraged, where each IAB node can hold a DU and a mobile-terminal (MT) function. Via the MT function, an IAB node can connect to its parent IAB node or the IAB donor like a UE. Via the DU function, the IAB node can communicate with UEs and MTs of child IAB nodes like a base station. The IAB-donor can hold a CU function, and each DU part of the IAB node can have an F1 control plane (F1-C) interface connection with IAB donor CU-Control Plane (CU-CP) and/or a CU-User Plane (CU-UP). Signaling between the DU in the IAB node and the CU-CP in the IAB donor can use an F1 Application Protocol (F1-AP). Further, the DU can connect to an IAB node via a wireless backhaul link, and an IAB node can connect to a UE via a wireless access link.

In one example, each IAB node in the IAB network is to support attachment of UEs and other IAB nodes. However, IAB nodes do not have full-fledged base station (gNB) capabilities. The IAB network leverages the Central Unit-Distributed Unit (CU-DU) split architecture. The radio resource control (RRC) functionality can be placed in the CU of the donor IAB node. Each IAB node can function as a DU. The IAB node can be controlled by the IAB donor in a manner similar to the DU control by the CU. Specifically, an F1 control plane protocol between the CU and the DU can be modified to support transmission over multiple hops, where the modified F1 protocols can enable the IAB donor to control the IAB nodes.

One consequence of the multi-hop architecture is delay due to data transmission on each hop followed by processing at intermediate nodes, which can be a problem for uplink data since intermediate nodes may have to request uplink resources (via a scheduling request and buffer status report) prior to transmission of the data.

In one example, each IAB node can operate as a combination of a DU (serving the next hop) and an MT (providing connectivity to the parent node). The MT of an IAB node embodies UE functionality to enable connectivity to the parent.

Figure 3:
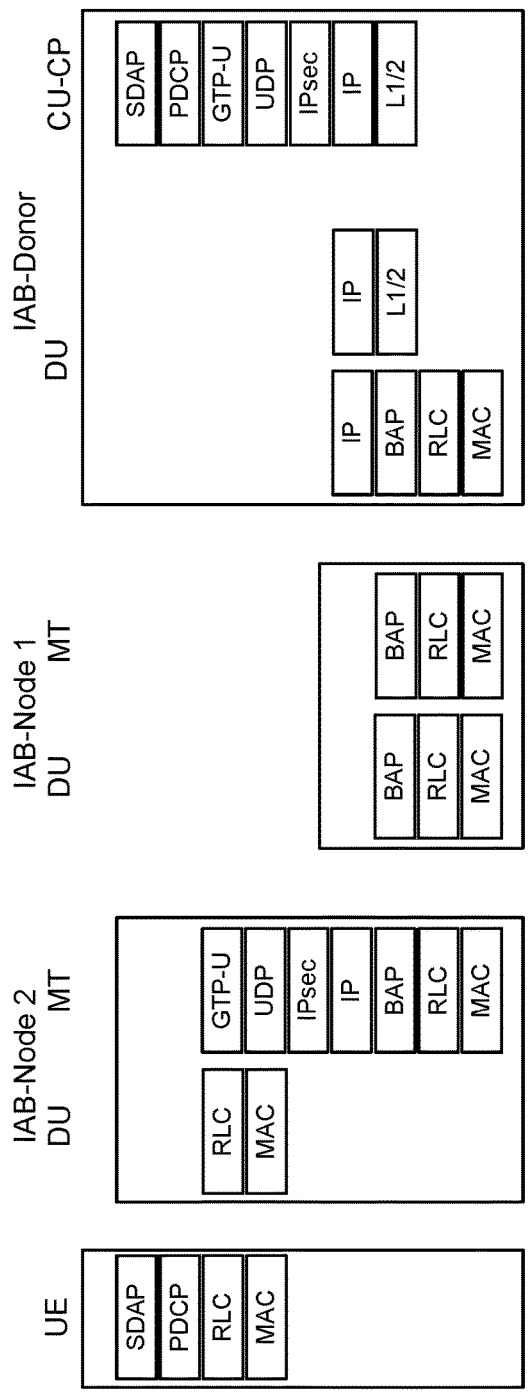
FIG. 3 illustrates a control plane protocol architecture for a multi-hop JAB network in accordance with an example.

FIG. 3 illustrates an example of a control plane protocol architecture for a multi-hop IAB network. The multi-hop IAB network can include an IAB donor, multiple IAB nodes and a UE. A radio resource control (RRC) message or a user plane packet traversing multiple hops can incur delays at each node related to standard UE operation and air interface delays. The delays can impact critical functions. For example, transmission of a measurement report from the UE to the IAB donor can take significantly longer, resulting in a higher proportion of handover failures and radio link failures. RRC connection establishment, reestablishment and RRC connection resume can take longer, which can result in a significantly lower level of performance compared to a non-IAB network. The delays can also impact user plane traffic (for example, a TCP ACK can take significantly longer to go through the multiple hops, resulting in slower overall TCP performance for both downlink and uplink).

Figure 4:
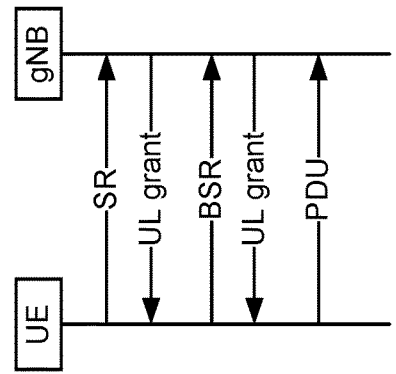
FIG. 4 illustrates an NR procedure for an uplink resource request in accordance with an example.

Techniques are described herein to minimize such additional delays resulting from multi-hop data transmissions. For example, pipelining of the uplink data transfer can be enabled. In other words, uplink transmission resource request procedures on successive hops can be performed in parallel and resources can be requested prior to data actually being received at the node, thereby resulting in reduction of uplink latency FIG. 4 illustrates an example of an NR procedure for an uplink resource request. For example, a UE can utilize such a procedure to request resources for an uplink transmission in NR. When uplink data arrives, if the UE does not have an uplink resource for transmission, the UE can trigger and transmit a scheduling request (SR). The network (e.g., gNB) can respond with an UL grant allocating resources for an uplink transmission. The UE can transmit a buffer status report (BSR) using the allocated resources. The BSR can indicate to the network an amount of buffered data at the UE. In response, the network can transmit one or more UL grants allocating resources for the UL transmission. The UL data buffered at the UE can be transmitted using one or more of these resources.

In one example, since the MT of each IAB node behaves as a UE with respect to its parent node, the above procedure for the UL resource request can be used for each intermediate hop.

Figure 5:
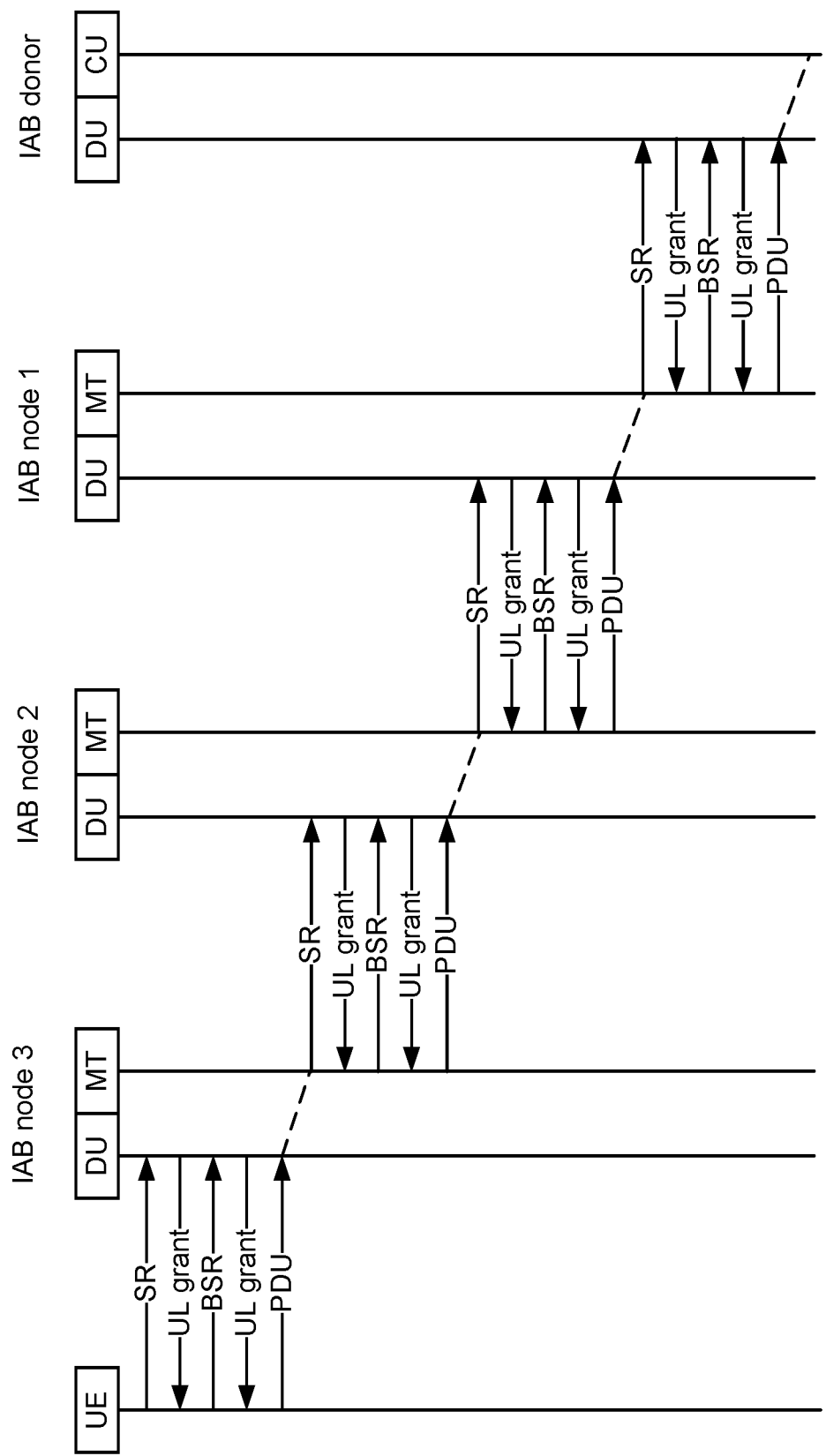
FIG. 5 illustrates a multi-hop transmission and resulting delays in accordance with an example.

FIG. 5 illustrates an example of a multi-hop transmission and resulting delays. For example, the multi-hop transmission can involve a transmission from a UE to an IAB donor via multiple IAB nodes (such as three separate IAB nodes in this example). In this example, at each hop, a sequence of an SR, UL grant, BSR, UL grant and protocol data unit (PDU) can be communicated. Such a sequence can be repeated at each hop. Based on the sequence of messages and increased data flow through a multi-hop IAB network to transmit an UL PDU, the resulting delays are large.

In one example, some steps between the UE and the gNB (as shown in FIG. 4) can be skipped depending on the specific situation. For example, if a UE has an UL resource, the UE may not trigger and transmit an SR. In this case, the UE can transmit the BSR or data in the available UL resource. In another situation, the UE can trigger and transmit an SR, but not transmit a BSR, which can occur when the UL resource provided in response to the SR accommodates all of the data buffered at the UE.

In one example, the UE behavior for UL resource requests can be defined. In one example, when UL data arrives in the buffer, if the UE does not have UL resources allocated, the UE transmits an SR.

In one example, when the UE has UL resources, and buffered data is for a common control channel (CCCH) logical channel (highest priority), the data can be transmitted in the UL grant. If there is additional data, and if the BSR can be fit in the UL grant, the BSR can be included. Otherwise, a BSR can be transmitted in the next UL grant (which may first necessitate an SR). In another example, when the UE has UL resources, and buffered data is for a logical channel other than CCCH (e.g., for DCCH or for DTCH), the UE can first include the BSR, and then in any remaining space include dedicated control channel (DCCH) or dedicated traffic channel (DTCH) data. In yet another example, when the UE has UL resources, and the UE has buffered data from more than one logical channel other than CCCH (e.g., data from both DTCH and DCCH), the UE can be free to choose which logical channel's data is prioritized for transmission. For example, if the UE has a critical DCCH message (e.g., a measurement report) and a DTCH PDU, the DTCH PDU can be transmitted before the critical DCCH message.

In one example, it is desirable to minimize delays from multi-hop uplink transmissions. Further, it is desirable to design techniques that maximize the reuse of the NR framework and protocols, particularly the behavior of the UEs.

Figure 6:
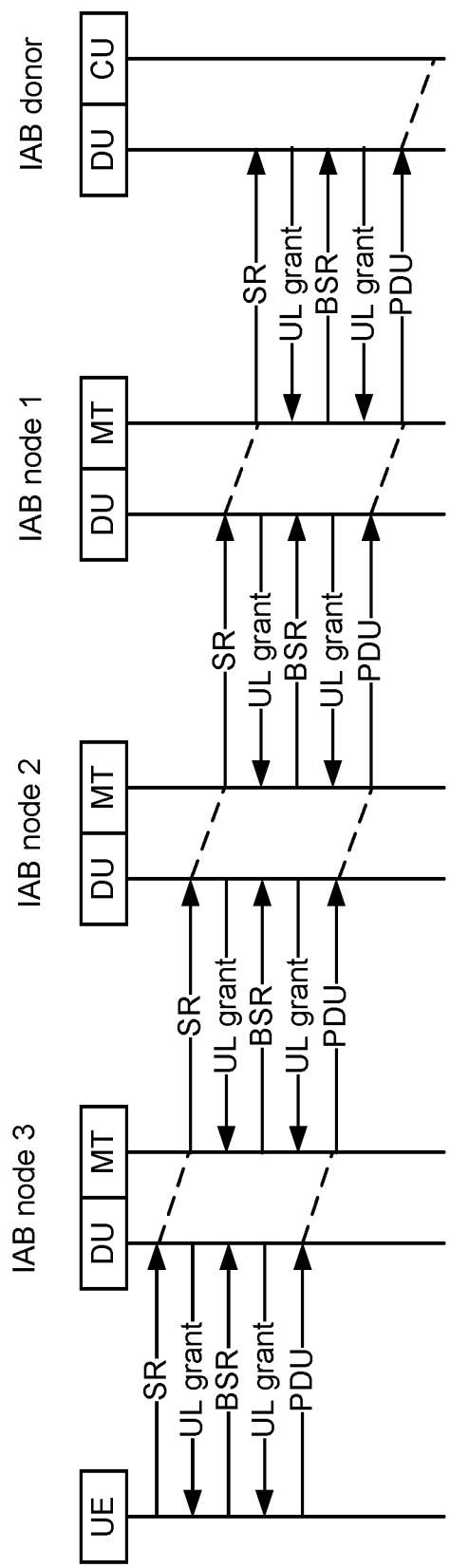
FIG. 6 illustrates a pipelining technique where uplink resources at intermediate nodes are allocated before data arrives at the intermediate nodes in accordance with an example.

FIG. 6 illustrates an example of a pipelining technique where uplink resources at intermediate nodes are allocated before data arrives at the intermediate nodes. In this technique, an SR can be triggered on a next hop based on a received SR. For example, when a DU of an IAB node receives an SR from a UE or a child IAB node, the DU can send an indication of data arrival to the MT of the IAB node (even if the data has not been received by the DU). The MT can then transmit an SR to its parent IAB node (or IAB donor). This process can continue until the IAB donor is reached. This approach can result in resources being allocated on each of the intermediate hops. When the DU of the UE's IAB node receives the PDU from the UE, the DU can submit the PDU (with any other necessary processing) to the MT for transmission. Meanwhile, the MT has already received UL resources for transmission and the MT transmits the PDU without delay. In this approach, the SR at intermediate nodes can be triggered based on the SR received from the child node.

Figure 7:
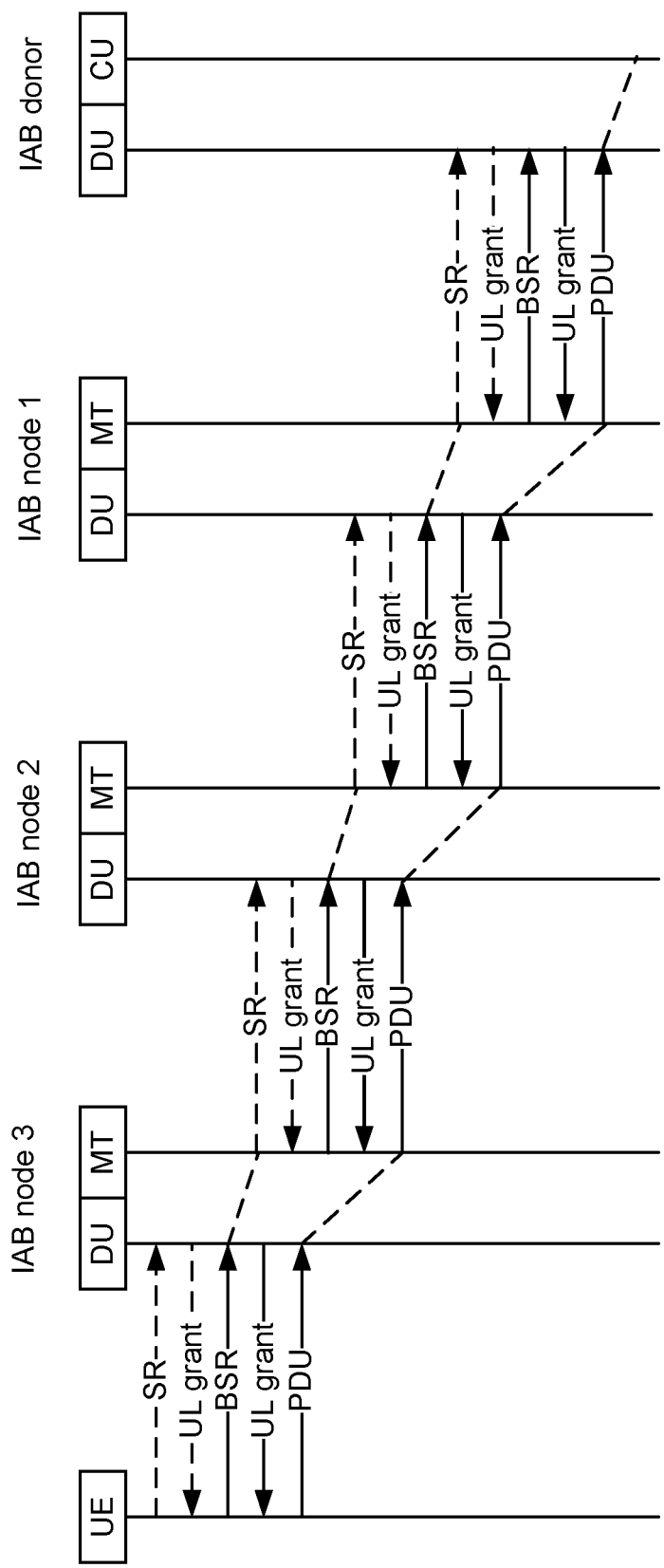
FIG. 7 illustrates another pipelining technique where uplink resources at intermediate nodes are allocated before data arrives at the intermediate nodes in accordance with an example.

FIG. 7 illustrates another example of a pipelining technique where uplink resources at intermediate nodes are allocated before data arrives at the intermediate nodes. In this technique, a BSR can be triggered on a next hop based on a received BSR. For example, when a DU of an IAB node receives a BSR from a UE or a child IAB node, the DU can send an indication of data arrival to the MT of the IAB node including the size of the data expected (even if the data has not been received by the DU). The UE or IAB node may need to transmit an SR and receive an UL grant, in order to transmit the BSR (i.e., if UL resources are not allocated). The MT can then transmit a BSR to its parent IAB node (or IAB donor), after obtaining UL resources if necessary. The BSR can include a size of expected data based on what is received from the child IAB node or UE. This process can continue until the IAB donor is reached. This approach can result in resources being allocated on each of the intermediate hops. When the DU of the UE's IAB node receives the PDU from the UE, the DU can submit the PDU (with any other necessary processing) to the MT for transmission. Meanwhile, the MT has already received UL resources for transmission and the MT transmits the PDU without delay. In this approach, the BSR at intermediate nodes can be triggered based on the BSR received from the child node.

In one example, if the data to be transmitted is small (e.g., control plane messages), the technique shown in FIG. 7 may not work as intended (i.e., it may not result in pipelined resource allocation). Specifically, when an UL grant is available (for example, provided in response to an SR), and can accommodate all of the buffered data, a BSR may not be transmitted. Thus, the procedure shown in FIG. 7 (which relies on a received BSR to transmit a BSR on the next hop) can fail to perform pipelining of resource allocation.

Furthermore, in the techniques shown in FIGS. 6 and 7, the BSR on the upstream hop can be sent only after the BSR of the downstream hop is received, which leads to a significant delay.

Figure 8:
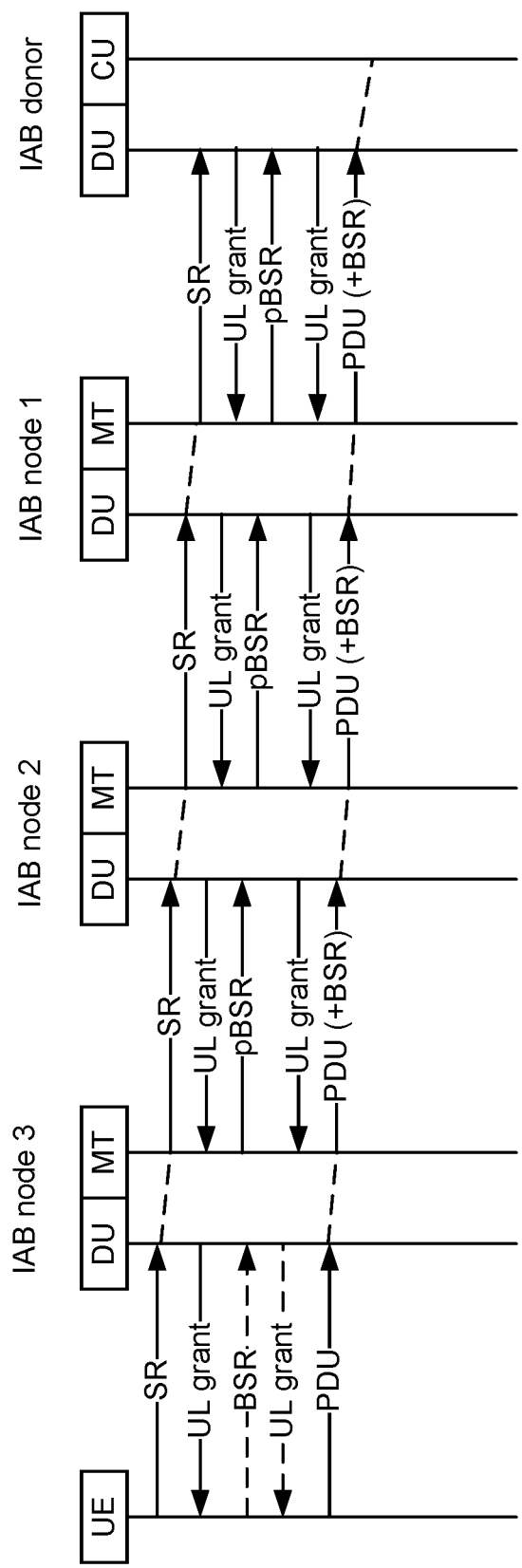
FIG. 8 illustrates a pipelining technique independent of data sizes in accordance with an example.

FIG. 8 illustrates an example of a pipelining technique independent of data sizes. In this technique, a single procedure can efficiently handle the pipelining operation independent of sizes of data and can also overcome the delay of waiting for BSR arrival from the downstream node. In this technique, an SR can be triggered on a next hop based on a received SR and a predictive BSR can be transmitted. More specifically, when a UE has UL data to transmit, the UE can transmit an SR and receive an UL grant. Depending on the size of the data and the size of the allocated UL resources, the UE may or may not need to transmit a BSR. In this example, a DU of IAB node 3, upon receiving the SR can indicate to the MT an expected arrival of data. The MT can trigger an SR transmission to a DU of IAB node 2. The MT of IAB node 3 can receive an UL grant from the DU of IAB node 2. The MT of IAB node 3 can then transmit a predictive BSR (pBSR) using the resources indicated in the UL grant.

In this approach, if a BSR has been received from the child node, the pBSR can be constructed based on information reported in the BSR. That is, buffered data indicated in the pBSR can include the data indicated in the received BSR (even though the data is not received yet). In another example, if no BSR has been received from the child node, the pBSR can indicate a default nominal size of resource allocation that should accommodate all control plane messages and at least a buffer status report.

Further, in this approach, in response to the pBSR, the DU of IAB node 2 can transmit one or more UL grants to the MT of IAB node 3. Meanwhile, the DU of IAB node 3 can receive the BSR from the UE (if it is transmitted) and the PDU. The DU submits the PDU (and possibly the BSR) to the MT. The MT can transmit the PDU along with its own BSR constructed based on the received BSR.

In one example, the process described above can be repeated at IAB node 2 and IAB node 1, until a PDU (and possibly a BSR) is sent to a DU of an IAB donor, which then sends the PDU (and possibly the BSR) to a CU of the IAB donor.

In one example, instead of a pBSR (as shown in FIG. 8), a specialized SR configuration, referred to as an IAB SR configuration can be used. The IAB SR configuration can include SR resources that are distinct from other SR resources. A transmission of the IAB SR (i.e., transmission of the SR using resources according to the IAB SR configuration) can indicate to the parent node a request for resource allocation for data that has not yet been received from the child node.

In a more specific example, an IAB SR can indicate to the network a nominal size of resource allocation that is to accommodate all control plane messages and at least a buffer status report. The nominal size implied by the IAB SR can be configured via RRC messaging, so that the parent node can allocate resources of the appropriate size. Further, the IAB SR resources can be organized to indicate different buffer levels. For example, the IAB SR resources can be further partitioned such that each partition maps to a different buffer level. If a BSR has been received from child nodes/UEs, the IAB SR corresponding to the buffer level indicated in the BSR can be chosen for transmission.

In one example, to accommodate cases of timing mismatch between arrival of the PDU and the availability of uplink resources (i.e., PDU arrives later than the time when uplink resources apply), the network can configure the feature 'skipUplinkTxDynamic'. With the feature configured, if the UE/MT does not transmit a PDU when an UL resource is available (e.g., due to the PDU including the BSR not having arrived at an IAB node), the network can provide another UL grant. Thus, in this example, the MT in the IAB node can send the pBSR only if 'skipUplinkTxDynamic' is not configured. If 'skipUplinkTxDynamic' is configured, the MT can continue to wait for the arrival of the PDU including the BSR, and can transmit the PDU when it becomes available using uplink resources available at that time.

Figure 9:
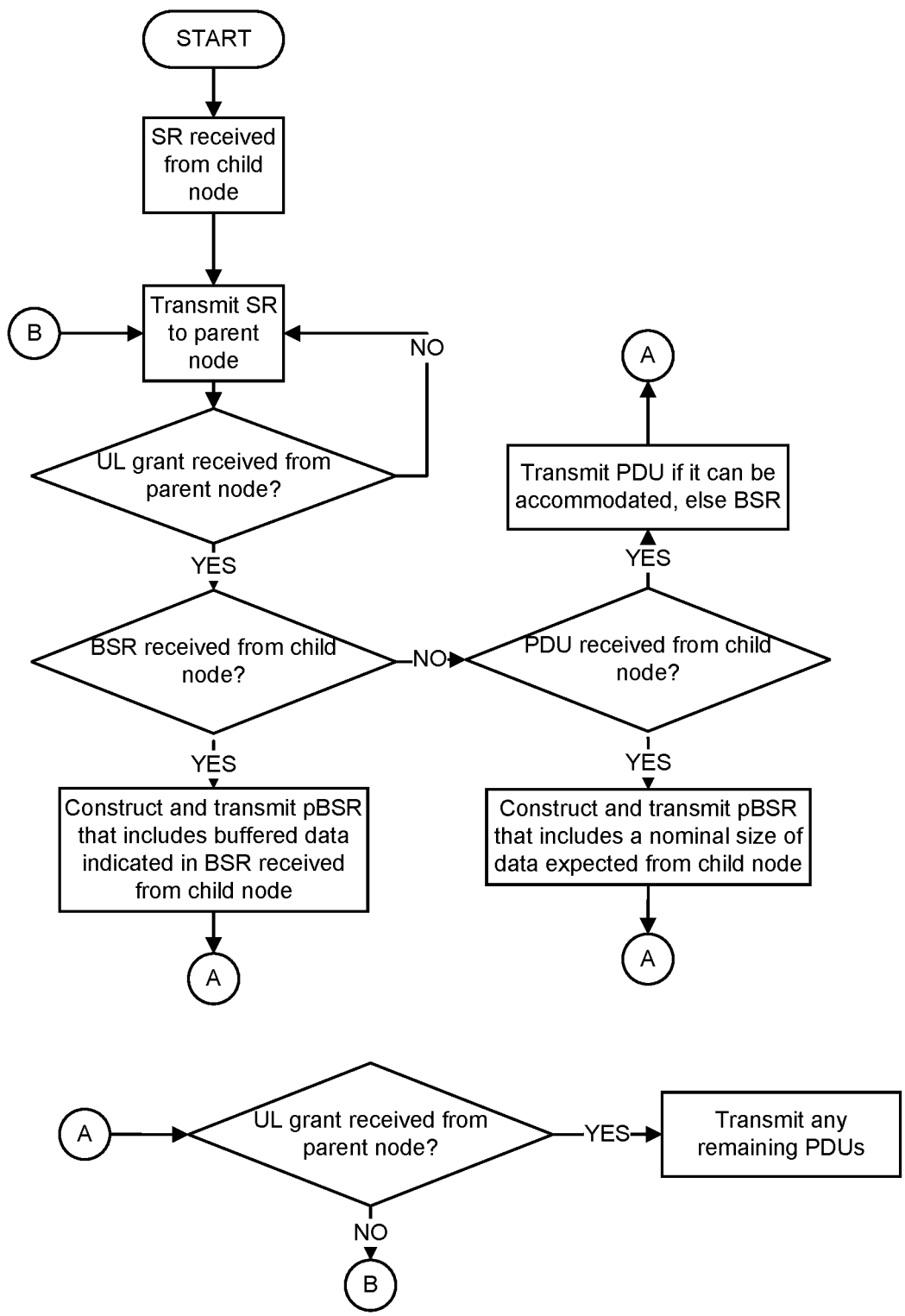
FIG. 9 is a flowchart illustrating a procedure at an integrated access and backhaul (IAB) node in accordance with an example.

FIG. 9 is a flowchart illustrating an example of a procedure at an integrated access and backhaul (IAB) node. An SR can be received from a child node at the IAB node. The SR can be transmitted from the IAB node to a parent node. If an UL grant is not received from the parent node, then the SR is again transmitted to the parent node. If an UL grant is received from the child node, then a determination can be made as to whether a BSR is received from the child node. If the BSR is received from the child node, then a pBSR can be constructed and transmitted, where the pBSR can include buffered data indicated in the BSR received from the child node. If the BSR is not received from the child node, then a determination can be made as to whether a PDU is received from the child node. If the PDU is received from the child node, then the PDU can be transmitted if the PDU can be accommodated, or else the BSR is transmitted. If the PDU is not received from the child node, then the pBSR can be constructed and transmitted, where the pBSR can include a nominal size of data expected from the child node. Further, if an UL grant is received from the parent node, then any remaining PDUs can be transmitted.

In one configuration, a relay node can receive from a downstream node a first indication of a future arrival of a packet. The relay node can transmit to a parent node a first size of buffered data, where the size of the buffered data can include data that is not received by the relay node. The relay node can receive from the parent node a resource for uplink transmission. The relay node can receive from the downstream node, subsequent to the transmission of the size of buffered data, a packet for uplink transmission. The relay node can transmit the packet using the resource for uplink transmission.

In one example, the relay node can receive, from a child node, a second size of buffered data. The relay node can transmit to the parent node the first size of buffered data, where the first size of buffered data includes (is greater or equal to) the second size of buffered data. In another example, the first size of buffered data can include a nominal size of data expected from a child node.

Figure 10:
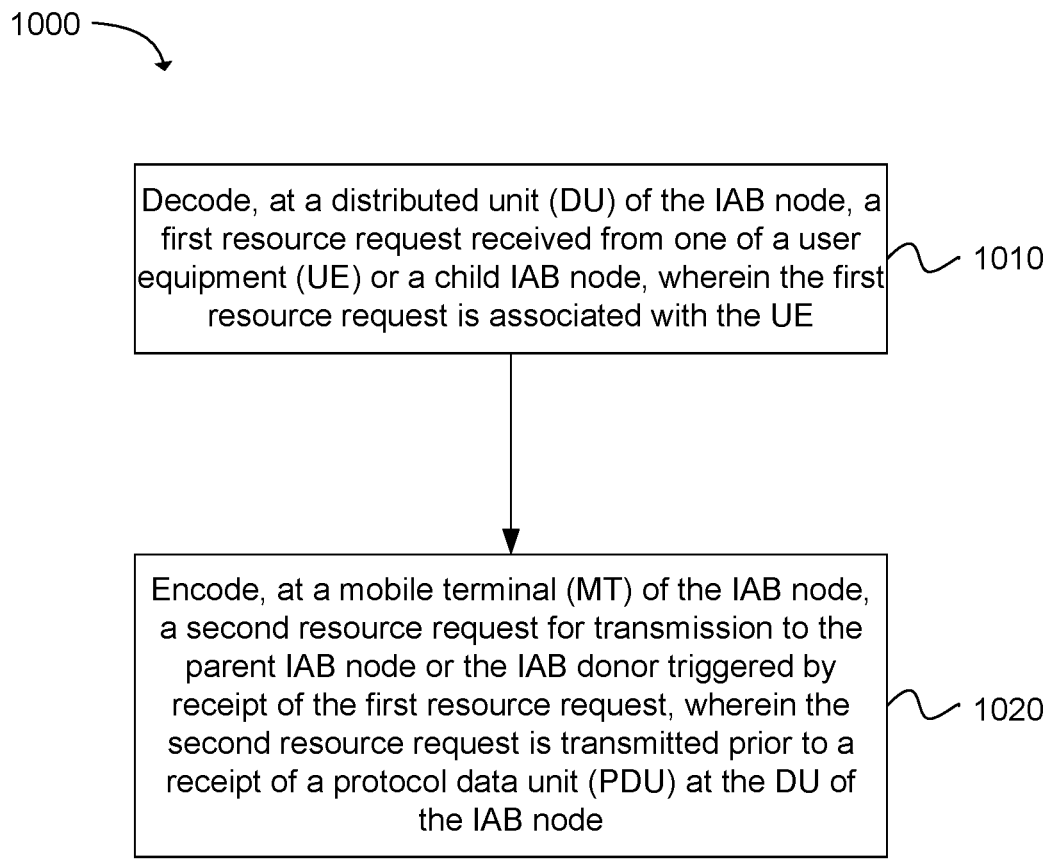
FIG. 10 depicts functionality of an Integrated Access and Backhaul (IAB) node in an IAB network in accordance with an example.

Another example provides functionality 1000 of an Integrated Access and Backhaul (IAB) node in an IAB network, as shown in FIG. 10. The IAB node can comprise one or more processors configured to decode, at a distributed unit (DU) of the IAB node, a first resource request received from one of a user equipment (UE) or a child IAB node, wherein the first resource request is associated with the UE, as in block 1010. The IAB node can comprise one or more processors configured to encode, at a mobile terminal (MT) of the IAB node, a second resource request for transmission to the parent IAB node or the IAB donor triggered by receipt of the first resource request, wherein the second resource request is transmitted prior to a receipt of a protocol data unit (PDU) at the DU of the IAB node, as in block 1020. In addition, the IAB node can comprise a memory interface configured to send to a memory the first resource request.

Figure 11:
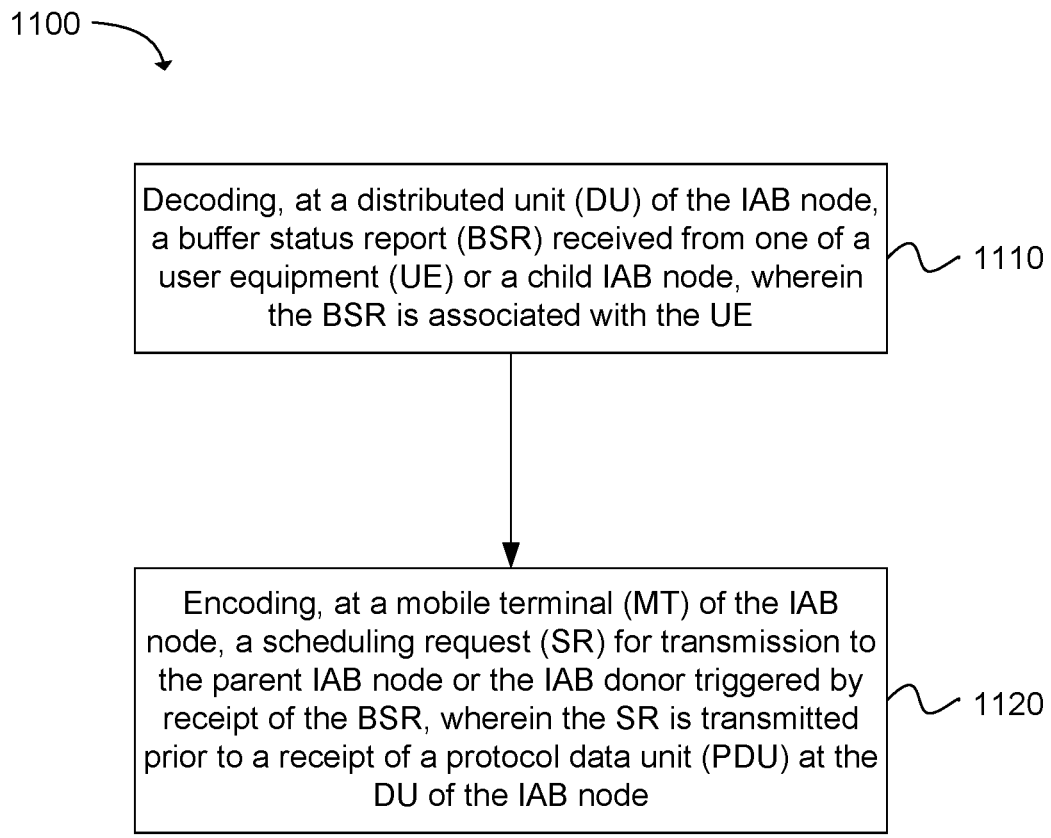
FIG. 11 depicts a flowchart of a machine readable storage medium having instructions embodied thereon for operating an Integrated Access and Backhaul (IAB) node in an IAB network in accordance with an example.

Another example provides at least one machine readable storage medium having instructions 1100 embodied thereon for operating an Integrated Access and Backhaul (IAB) node in an IAB network, as shown in FIG. 11. The instructions can be executed on a machine, where the instructions are included on at least one computer readable medium or one non-transitory machine readable storage medium. The instructions when executed by one or more processors perform: decoding, at a distributed unit (DU) of the IAB node, a buffer status report (BSR) received from one of a user equipment (UE) or a child IAB node, wherein the BSR is associated with the UE, as in block 1110. The instructions when executed by the one or more processors perform: encoding, at a mobile terminal (MT) of the IAB node, a scheduling request (SR) for transmission to the parent IAB node or the IAB donor triggered by receipt of the BSR, wherein the SR is transmitted prior to a receipt of a protocol data unit (PDU) at the DU of the IAB node, as in block 1120.

Figure 12:
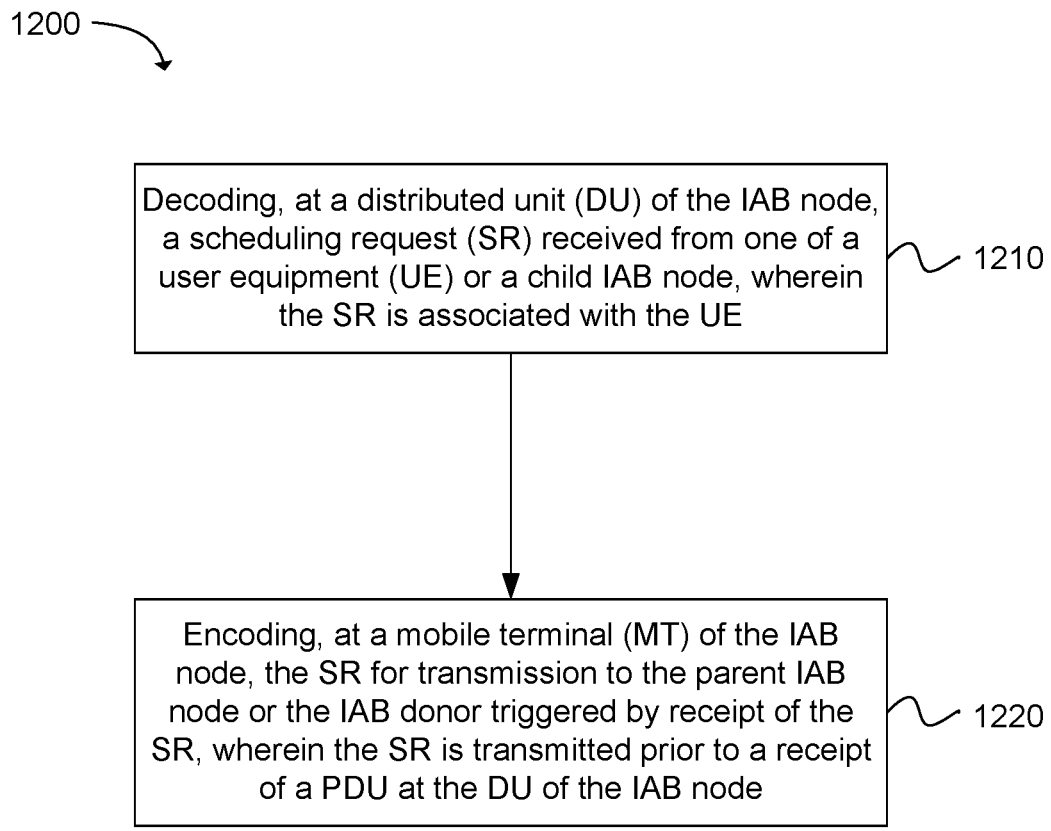
FIG. 12 depicts a flowchart of a machine readable storage medium having instructions embodied thereon for operating an Integrated Access and Backhaul (IAB) node in an IAB network in accordance with an example.

Another example provides at least one machine readable storage medium having instructions 1200 embodied thereon for operating an Integrated Access and Backhaul (IAB) node in an IAB network, as shown in FIG. 12. The instructions can be executed on a machine, where the instructions are included on at least one computer readable medium or one non-transitory machine readable storage medium. The instructions when executed by one or more processors perform: decoding, at a distributed unit (DU) of the JAB node, a scheduling request (SR) received from one of a user equipment (UE) or a child JAB node, wherein the SR is associated with the UE, as in block 1210. The instructions when executed by the one or more processors perform:

encoding, at a mobile terminal (MT) of the IAB node, the SR for transmission to the parent JAB node or the IAB donor triggered by receipt of the SR, wherein the SR is transmitted prior to a receipt of a PDU at the DU of the IAB node, as in block 1220.

Figure 13:
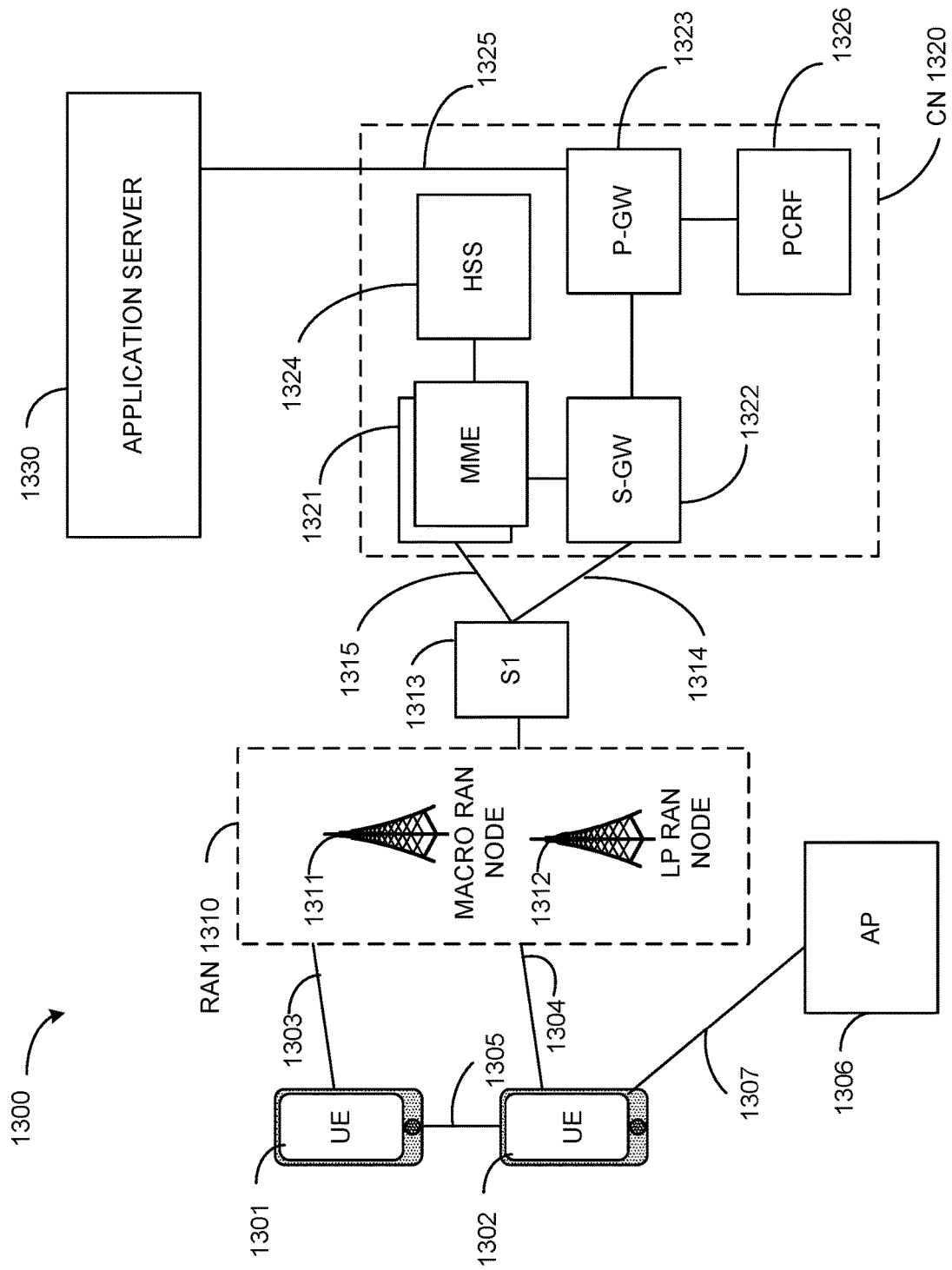
FIG. 13 illustrates an architecture of a wireless network in accordance with an example.

FIG. 13 illustrates an architecture of a system 1300 of a network in accordance with some embodiments. The system 1300 is shown to include a user equipment (UE) 1301 and a UE 1302. The UEs 1301 and 1302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1301 and 1302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 and 1302 may be configured to connect, e.g., communicatively couple, with a radio access network (RAN) 1310 the RAN 1310 may be, for example, an Evolved Universal Mobile Telecommunications System (UMTS) Terrestrial Radio Access Network (E-UTRAN), a NextGen RAN (NG RAN), or some other type of RAN. The UEs 1301 and 1302 utilize connections 1303 and 1304, respectively, each of which comprises a physical communications interface or layer (discussed in further detail below); in this example, the connections 1303 and 1304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1301 and 1302 may further directly exchange communication data via a ProSe interface 1305. The ProSe interface 1305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1302 is shown to be configured to access an access point (AP) 1306 via connection 1307. The connection 1307 can comprise a local wireless connection, such as a connection consistent with any IEEE 802.15 protocol, wherein the AP 1306 would comprise a wireless fidelity (WiFi®) router. In this example, the AP 1306 is shown to be connected to the Internet without connecting to the core network of the wireless system (described in further detail below).

The RAN 1310 can include one or more access nodes that enable the connections 1303 and 1304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1310 may include one or more RAN nodes for providing macrocells, e.g., macro RAN node 1311, and one or more RAN nodes for providing femtocells or picocells (e.g., cells having smaller coverage areas, smaller user capacity, or higher bandwidth compared to macrocells), e.g., low power (LP) RAN node 1312.

Any of the RAN nodes 1311 and 1312 can terminate the air interface protocol and can be the first point of contact for the UEs 1301 and 1302. In some embodiments, any of the RAN nodes 1311 and 1312 can fulfill various logical functions for the RAN 1310 including, but not limited to, radio network controller (RNC) functions such as radio bearer management, uplink and downlink dynamic radio resource management and data packet scheduling, and mobility management.

In accordance with some embodiments, the UEs 1301 and 1302 can be configured to communicate using Orthogonal Frequency-Division Multiplexing (OFDM) communication signals with each other or with any of the RAN nodes 1311 and 1312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 and 1312 to the UEs 1301 and 1302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1301 and 1302. The physical downlink control channel (PDCCH) may carry information about the transport format and resource allocations related to the PDSCH channel, among other things. It may also inform the UEs 1301 and 1302 about the transport format, resource allocation, and H-ARQ (Hybrid Automatic Repeat Request) information related to the uplink shared channel. Typically, downlink scheduling (assigning control and shared channel resource blocks to the UE 1302 within a cell) may be performed at any of the RAN nodes 1311 and 1312 based on channel quality information fed back from any of the UEs 1301 and 1302. The downlink resource assignment information may be sent on the PDCCH used for (e.g., assigned to) each of the UEs 1301 and 1302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1310 is shown to be communicatively coupled to a core network (CN) 1320—via an S1 interface 1313. In embodiments, the CN 1320 may be an evolved packet core (EPC) network, a NextGen Packet Core (NPC) network, or some other type of CN. In this embodiment the S1 interface 1313 is split into two parts: the S1-U interface 1314, which carries traffic data between the RAN nodes 1311 and 1312 and the serving gateway (S-GW) 1322, and the S1-mobility management entity (MME) interface 1315, which is a signaling interface between the RAN nodes 1311 and 1312 and MMEs 1321.

In this embodiment, the CN 1320 comprises the MMEs 1321, the S-GW 1322, the Packet Data Network (PDN) Gateway (P-GW) 1323, and a home subscriber server (HSS) 1324. The MMEs 1321 may be similar in function to the control plane of legacy Serving General Packet Radio Service (GPRS) Support Nodes (SGSN). The MMEs 1321 may manage mobility aspects in access such as gateway selection and tracking area list management. The HSS 1324 may comprise a database for network users, including subscription-related information to support the network entities' handling of communication sessions. The CN 1320 may comprise one or several HSSs 1324, depending on the number of mobile subscribers, on the capacity of the equipment, on the organization of the network, etc. For example, the HSS 1324 can provide support for routing/roaming, authentication, authorization, naming/addressing resolution, location dependencies, etc.

The S-GW 1322 may terminate the S1 interface 1313 towards the RAN 1310, and routes data packets between the RAN 1310 and the CN 1320. In addition, the S-GW 1322 may be a local mobility anchor point for inter-RAN node handovers and also may provide an anchor for inter-3GPP mobility. Other responsibilities may include lawful intercept, charging, and some policy enforcement.

The P-GW 1323 may terminate an SGi interface toward a PDN. The P-GW 1323 may route data packets between the EPC network 1323 and external networks such as a network including the application server 1330 (alternatively referred to as application function (AF)) via an Internet Protocol (IP) interface 1325. Generally, the application server 1330 may be an element offering applications that use IP bearer resources with the core network (e.g., UMTS Packet Services (PS) domain, LTE PS data services, etc.). In this embodiment, the P-GW 1323 is shown to be communicatively coupled to an application server 1330 via an IP communications interface 1325. The application server 1330 can also be configured to support one or more communication services (e.g., Voice-over-Internet Protocol (VoTP) sessions, PTT sessions, group communication sessions, social networking services, etc.) for the UEs 1301 and 1302 via the CN 1320.

The P-GW 1323 may further be a node for policy enforcement and charging data collection. Policy and Charging Enforcement Function (PCRF) 1326 is the policy and charging control element of the CN 1320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1326 may be communicatively coupled to the application server 1330 via the P-GW 1323. The application server 1330 may signal the PCRF 1326 to indicate a new service flow and select the appropriate Quality of Service (QoS) and charging parameters. The PCRF 1326 may provision this rule into a Policy and Charging Enforcement Function (PCEF) (not shown) with the appropriate traffic flow template (TFT) and QoS class of identifier (QCI), which commences the QoS and charging as specified by the application server 1330.

Figure 14:
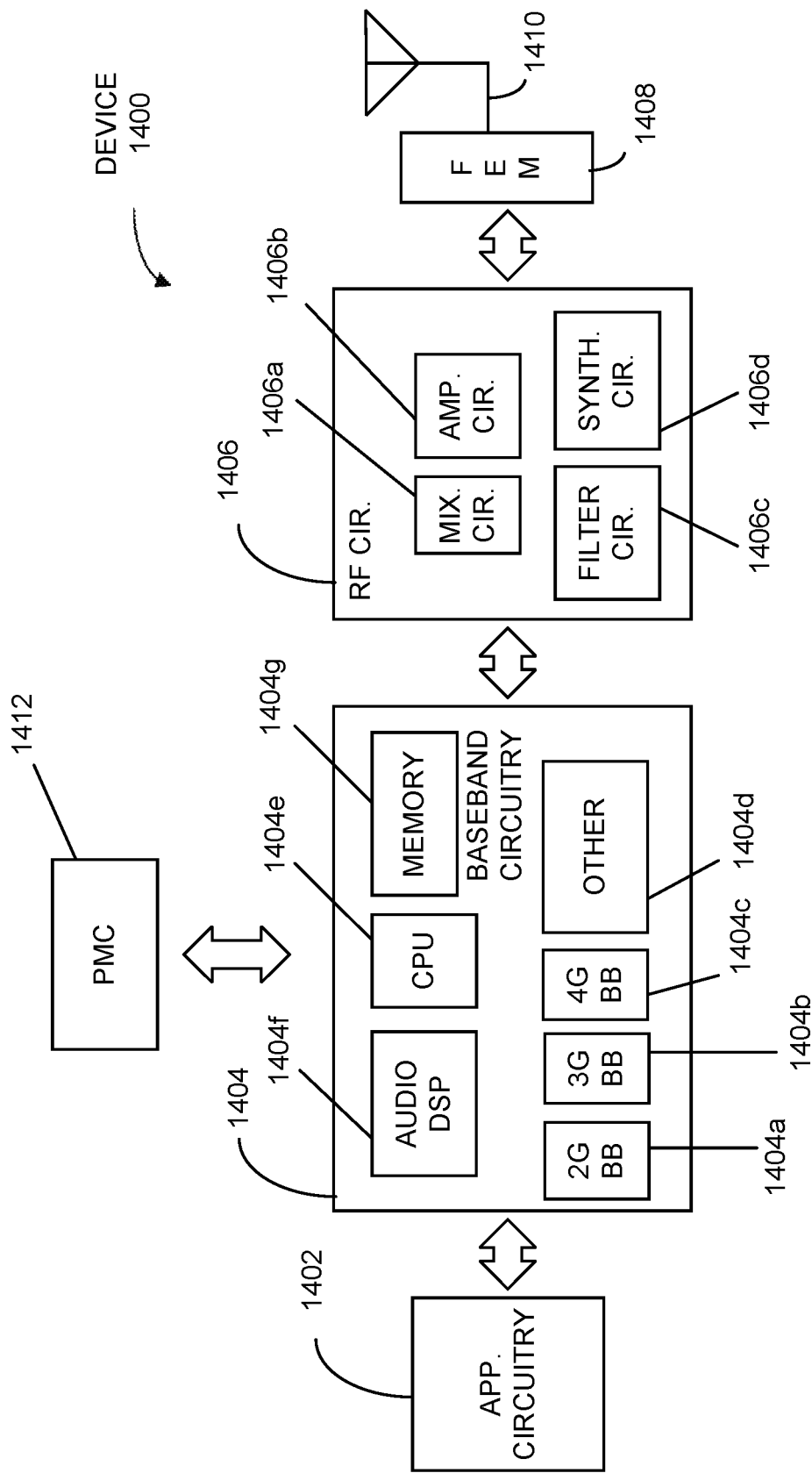
FIG. 14 illustrates a diagram of a wireless device (e.g., UE) in accordance with an example.

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or a RAN node. In some embodiments, the device 1400 may include less elements (e.g., a RAN node may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband circuitry 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404*a*, a fourth generation (4G) baseband processor 1404*b*, a fifth generation (5G) baseband processor 1404*c*, or other baseband processor(s) 1404*d* for other existing generations, generations in development or to be developed in the future (e.g., second generation (2G), sixth generation (6G), etc.). The baseband circuitry 1404 (e.g., one or more of baseband processors 1404*a-d*) may handle various radio control functions that enable communication with one or more radio networks via the RF circuitry 1406. In other embodiments, some or all of the functionality of baseband processors 1404*a-d* may be included in modules stored in the memory 1404*g* and executed via a Central Processing Unit (CPU) 1404*e*. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404*f*. The audio DSP(s) 1404*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406*a*, amplifier circuitry 1406*b* and filter circuitry 1406*c*. In some embodiments, the transmit signal path of the RF circuitry 1406 may include filter circuitry 1406*c* and mixer circuitry 1406*a*. RF circuitry 1406 may also include synthesizer circuitry 1406*d* for synthesizing a frequency for use by the mixer circuitry 1406*a* of the receive signal path and the transmit signal path. In some embodiments, the mixer circuitry 1406*a* of the receive signal path may be configured to down-convert RF signals received from the FEM circuitry 1408 based on the synthesized frequency provided by synthesizer circuitry 1406*d*. The amplifier circuitry 1406*b* may be configured to amplify the down-converted signals and the filter circuitry 1406*c* may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406*a* of the receive signal path may comprise passive mixers, although the scope of the embodiments is not limited in this respect.

In some embodiments, the mixer circuitry 1406*a* of the transmit signal path may be configured to up-convert input baseband signals based on the synthesized frequency provided by the synthesizer circuitry 1406*d* to generate RF output signals for the FEM circuitry 1408. The baseband signals may be provided by the baseband circuitry 1404 and may be filtered by filter circuitry 1406*c*.

In some embodiments, the mixer circuitry 1406*a* of the receive signal path and the mixer circuitry 1406*a* of the transmit signal path may include two or more mixers and may be arranged for quadrature downconversion and upconversion, respectively. In some embodiments, the mixer circuitry 1406*a* of the receive signal path and the mixer circuitry 1406*a* of the transmit signal path may include two or more mixers and may be arranged for image rejection (e.g., Hartley image rejection). In some embodiments, the mixer circuitry 1406*a* of the receive signal path and the mixer circuitry 1406*a* may be arranged for direct downconversion and direct upconversion, respectively. In some embodiments, the mixer circuitry 1406*a* of the receive signal path and the mixer circuitry 1406*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406*d* may be a fractional-N synthesizer or a fractional N/N+1 synthesizer, although the scope of the embodiments is not limited in this respect as other types of frequency synthesizers may be suitable. For example, synthesizer circuitry 1406*d* may be a delta-sigma synthesizer, a frequency multiplier, or a synthesizer comprising a phase-locked loop with a frequency divider.

The synthesizer circuitry 1406*d* may be configured to synthesize an output frequency for use by the mixer circuitry 1406*a* of the RF circuitry 1406 based on a frequency input and a divider control input. In some embodiments, the synthesizer circuitry 1406*d* may be a fractional N/N+1 synthesizer.

In some embodiments, frequency input may be provided by a voltage controlled oscillator (VCO), although that is not a requirement. Divider control input may be provided by either the baseband circuitry 1404 or the application circuitry 1402 depending on the desired output frequency. In some embodiments, a divider control input (e.g., N) may be determined from a look-up table based on a channel indicated by the application circuitry 1402.

Synthesizer circuitry 1406*d* of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM circuitry 1408, or in both the RF circuitry 1406 and the FEM circuitry 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 1412 may be additionally or alternatively coupled with, and perform similar power management operations for, other components such as, but not limited to, application circuitry 1402, RF circuitry 1406, or FEM circuitry 1408.

In some embodiments, the PMC 1412 may control, or otherwise be part of, various power saving mechanisms of the device 1400. For example, if the device 1400 is in an RRC_Connected state, where it is still connected to the RAN node as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
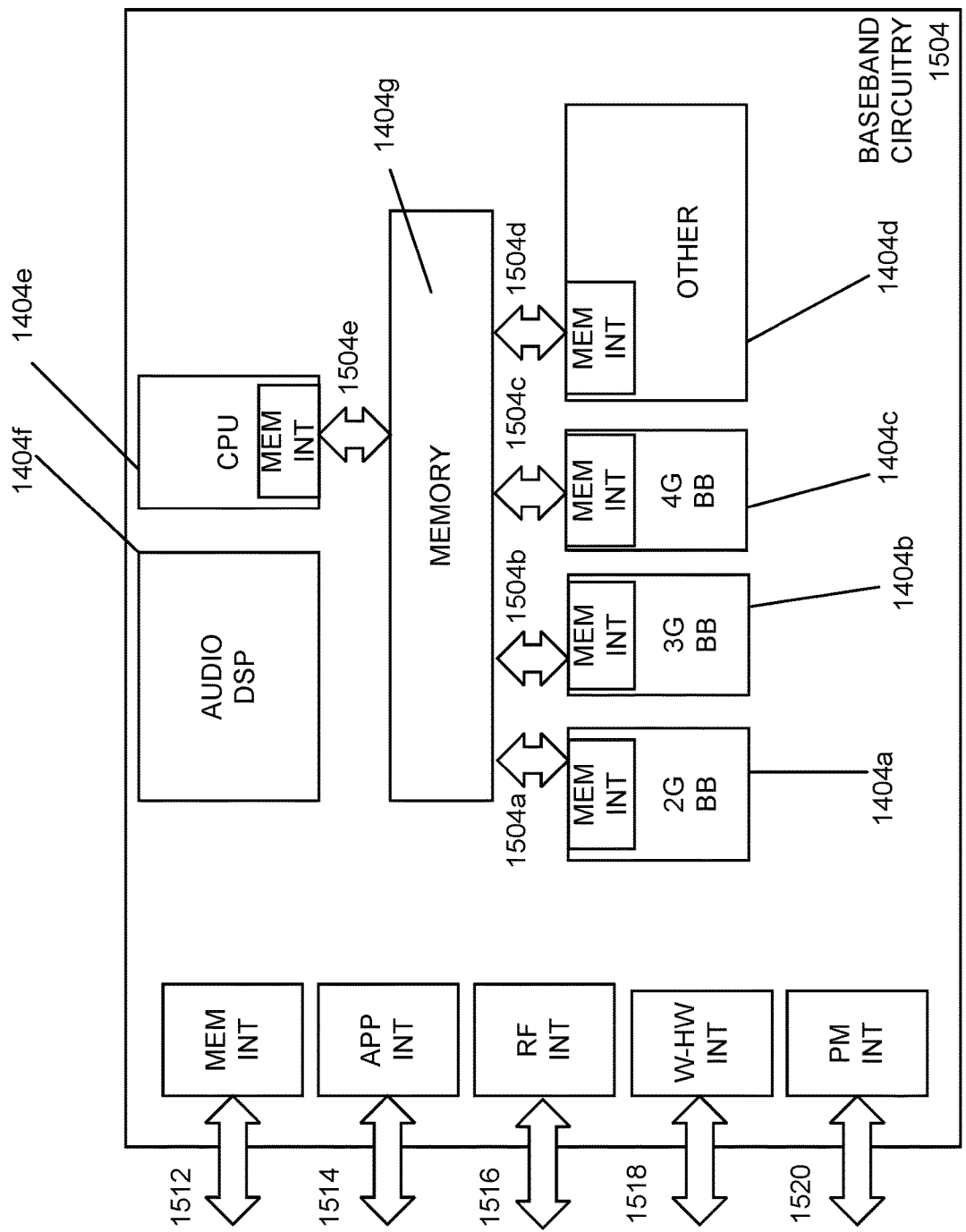
FIG. 15 illustrates interfaces of baseband circuitry in accordance with an example.

FIG. 15 illustrates example interfaces of baseband circuitry in accordance with some embodiments. As discussed above, the baseband circuitry 1404 of FIG. 14 may comprise processors 1404a-1404e and a memory 1404g utilized by said processors. Each of the processors 1404a-1404e may include a memory interface, 1504a-1504e, respectively, to send/receive data to/from the memory 1404g.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412.

Figure 16:
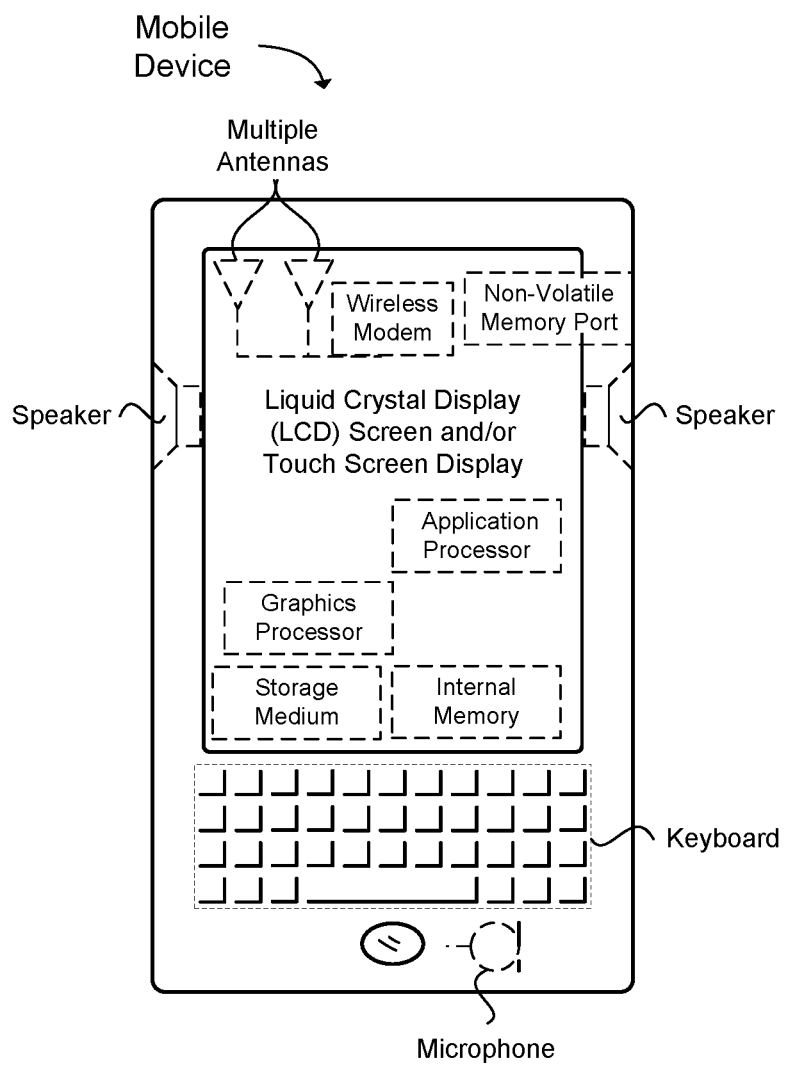
FIG. 16 illustrates a diagram of a wireless device (e.g., UE) in accordance with an example.

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of an Integrated Access and Backhaul (IAB) node in an IAB network, the apparatus comprising: one or more processors configured to: decode, at a distributed unit (DU) of the IAB node, a first resource request received from one of a user equipment (UE) or a child IAB node, wherein the first resource request is associated with the UE; and encode, at a mobile terminal (MT) of the IAB node, a second resource request for transmission to the parent IAB node or the IAB donor triggered by receipt of the first resource request, wherein the second resource request is transmitted prior to a receipt of a protocol data unit (PDU) at the DU of the IAB node; and a memory interface configured to send to a memory the first resource request.

Example 2 includes the apparatus of Example 1, wherein the first resource request is a buffer status report (BSR) and the second resource request is a BSR.

Example 3 includes the apparatus of any of Examples 1 to 2, wherein the first resource request is a scheduling request (SR) and the second resource request is an SR.

Example 4 includes the apparatus of any of Examples 1 to 3, wherein the first resource request is a buffer status report (BSR) and the second resource request is a scheduling request (SR).

Example 5 includes the apparatus of any of Examples 1 to 4, wherein the one or more processors are further configured to: decode, at the MT of the IAB node, a first uplink grant received from the parent IAB node or the IAB donor; encode, at the MT of the IAB node, the first resource request for transmission to the parent IAB node or the IAB donor using the first uplink grant, wherein the first resource request includes the size of expected data in the UE buffer; decode, at the MT of the IAB node, a second uplink grant received from the parent IAB node or the IAB donor; decode, at the DU of the IAB node, the PDU received from the UE or the child IAB node, wherein the PDU at the IAB node is received after the first resource request is transmitted to the parent IAB node or the IAB donor; and encode, at the MT of the IAB node, the PDU for transmission to the parent IAB node or the IAB donor using the second uplink grant.

Example 6 includes the apparatus of any of Examples 1 to 5, wherein the one or more processors are configured to encode the PDU for transmission after reception of the PDU without delay based on the second uplink grant already received at the IAB node.

Example 7 includes the apparatus of any of Examples 1 to 6, wherein the one or more processors are further configured to: communicate, in response to receipt of the first resource request, an indication of data arrival from the DU of the IAB node to the MT of the IAB node, wherein the indication of data arrival includes a size of expected data in a UE buffer.

Example 8 includes the apparatus of any of Examples 1 to 7, wherein the one or more processors are configured to: communicate the PDU from the DU of the IAB node to the MT of the IAB node.

Example 9 includes the apparatus of any of Examples 1 to 8, wherein the second resource request is a predictive buffer status report (pBSR).

Example 10 includes the apparatus of any of Examples 1 to 9, wherein the pBSR includes information included in the first resource request received from the UE or the child IAB node, wherein the first resource request is a buffer status report (BSR).

Example 11 includes the apparatus of any of Examples 1 to 10, wherein the pBSR includes a default nominal size of resource allocation that accommodates a control plane message and the first resource request, wherein the first resource request is a buffer status report (BSR) and no BSR is received from the UE or the child IAB node.

Example 12 includes at least one machine readable storage medium having instructions embodied thereon for operating an Integrated Access and Backhaul (IAB) node in an IAB network, the instructions when executed by one or more processors perform the following: decoding, at a distributed unit (DU) of the IAB node, a buffer status report (BSR) received from one of a user equipment (UE) or a child IAB node, wherein the BSR is associated with the UE; and encoding, at a mobile terminal (MT) of the IAB node, a scheduling request (SR) for transmission to the parent IAB node or the IAB donor triggered by receipt of the BSR, wherein the SR is transmitted prior to a receipt of a protocol data unit (PDU) at the DU of the IAB node.

Example 13 includes the at least one machine readable storage medium of Example 12, further comprising instructions when executed perform the following: decoding, at the MT of the IAB node, a first uplink grant received from the parent IAB node or the IAB donor; encoding, at the MT of the IAB node, the BSR for transmission to the parent IAB node or the IAB donor using the first uplink grant, wherein the BSR includes a size of expected data in the UE buffer; decoding, at the MT of the IAB node, a second uplink grant received from the parent IAB node or the IAB donor; decoding, at the DU of the IAB node, the PDU received the UE or the child IAB node, wherein the PDU at the IAB node is received after the BSR is transmitted to the parent IAB node or the IAB donor; and encoding, at the MT of the IAB node, the PDU for transmission to the parent IAB node or the IAB donor using the second uplink grant.

Example 14 includes the at least one machine readable storage medium of any of Examples 12 to 13, further comprising instructions when executed perform the following: encoding the PDU for transmission after reception of the PDU without delay based on the second uplink grant already received at the IAB node.

Example 15 includes the at least one machine readable storage medium of any of Examples 12 to 14, further comprising instructions when executed perform the following: communicating, in response to receipt of the BSR, an indication of data arrival from the DU of the IAB node to the MT of the IAB node, wherein the indication of data arrival includes a size of expected data in a UE buffer.

Example 16 includes the at least one machine readable storage medium of any of Examples 12 to 15, further comprising instructions when executed perform the following: communicating the PDU from the DU of the IAB node to the MT of the IAB node.

Example 17 includes at least one machine readable storage medium having instructions embodied thereon for operating an Integrated Access and Backhaul (IAB) node in an IAB network, the instructions when executed by one or more processors perform the following: decoding, at a distributed unit (DU) of the IAB node, a scheduling request (SR) received from one of a user equipment (UE) or a child IAB node, wherein the SR is associated with the UE; and encoding, at a mobile terminal (MT) of the IAB node, the SR for transmission to the parent IAB node or the IAB donor triggered by receipt of the SR, wherein the SR is transmitted prior to a receipt of a PDU at the DU of the IAB node.

Example 18 includes the at least one machine readable storage medium of Example 17, further comprising instructions when executed perform the following: decoding, at the MT of the IAB node, a first uplink grant received from the parent IAB node or the IAB donor; encoding, at the MT of the IAB node, a buffer status report (BSR) for transmission to the parent IAB node or the IAB donor using the first uplink grant; decoding, at the MT of the IAB node, a second uplink grant received from the parent IAB node or the IAB donor; decoding, at the DU of the IAB node, the PDU received the UE or the child IAB node, wherein the PDU at the IAB node is received after the SR is transmitted to the parent IAB node or the IAB donor; and encoding, at the MT of the IAB node, the PDU for transmission to the parent IAB node or the IAB donor using the second uplink grant.

Example 19 includes the at least one machine readable storage medium of any of Examples 17 to 18, further comprising instructions when executed perform the following: encoding the PDU for transmission after reception of the PDU without delay based on the second uplink grant already received at the IAB node.

Example 20 includes the at least one machine readable storage medium of any of Examples 17 to 19, further comprising instructions when executed perform the following: communicating the PDU from the DU of the IAB node to the MT of the IAB node.

Example 21 includes the at least one machine readable storage medium of any of Examples 17 to 20, further comprising instructions when executed perform the following: decoding, at the MT of the IAB node, a first uplink grant received from the parent IAB node or the IAB donor; encoding, at the MT of the IAB node, a predictive buffer status report (pBSR) for transmission to the parent IAB node or the IAB donor using the first uplink grant; decoding, at the MT of the IAB node, a second uplink grant received from the parent IAB node or the IAB donor, wherein the second uplink grant is received in response to the pBSR; decoding, at the DU of the IAB node, the PDU received the UE or the child IAB node, wherein the PDU at the IAB node is received after the SR is transmitted to the parent IAB node or the IAB donor; and encoding, at the MT of the IAB node, the PDU for transmission to the parent IAB node or the IAB donor using the second uplink grant.

Example 22 includes the at least one machine readable storage medium of any of Examples 17 to 21, further comprising instructions when executed perform the following: encoding a buffer status report (BSR) for transmission along with the PDU from the MT of the IAB node to the parent IAB node or the IAB donor using the second uplink grant, wherein the pBSR includes information included in the BSR received from the UE or the child IAB node.

Example 23 includes the at least one machine readable storage medium of any of Examples 17 to 22, further comprising instructions when executed perform the following: decoding, at the DU of the IAB node, the BSR received from the UE or the child IAB node; and communicating the BSR from the DU of the IAB node to the MT of the IAB node.

Example 24 includes the at least one machine readable storage medium of any of Examples 17 to 23, wherein the pBSR includes a default nominal size of resource allocation that accommodates a control plane message and the BSR, when no BSR is received from the UE or the child IAB node.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

The invention claimed is:

1. At least one non-transitory machine readable storage medium having instructions embodied thereon for operating an Integrated Access and Backhaul (IAB) node in an IAB network, the instructions when executed by one or more processors perform the following:
    decoding, at a distributed unit (DU) of the IAB node, a buffer status report (BSR) received from one of a user equipment (UE) or a child IAB node, wherein the BSR is associated with the UE;
    encoding, at a mobile terminal (MT) of the IAB node, a scheduling request (SR) for transmission to a parent IAB node or an IAB donor triggered by receipt of the BSR, wherein the SR is transmitted prior to a receipt of a protocol data unit (PDU) at the DU of the IAB node;
    decoding, at the MT of the IAB node, a first uplink grant received from the parent IAB node or the IAB donor; and
    encoding, at the MT of the IAB node, a predictive buffer status report (pBSR) for transmission to the parent IAB node or the IAB donor using the first uplink grant.

2. The at least one non-transitory machine readable storage medium of claim 1, further comprising instructions when executed perform the following:
    decoding, at the MT of the IAB node, a second uplink grant received from the parent IAB node or the IAB donor;
    decoding, at the DU of the IAB node, the PDU received the UE or the child IAB node, wherein the PDU at the IAB node is received after the pBSR is transmitted to the parent IAB node or the IAB donor; and
    encoding, at the MT of the IAB node, the PDU for transmission to the parent IAB node or the IAB donor using the second uplink grant.

3. The at least one non-transitory machine readable storage medium of claim 2, further comprising instructions when executed perform the following: encoding the PDU for transmission after reception of the PDU without delay based on the second uplink grant already received at the IAB node.

4. The at least one non-transitory machine readable storage medium of claim 2, further comprising instructions when executed perform the following: communicating, in response to receipt of the BSR, an indication of data arrival from the DU of the IAB node to the MT of the IAB node, wherein the indication of data arrival includes a size of expected data in a UE buffer.

5. The at least one non-transitory machine readable storage medium of claim 1, further comprising instructions when executed perform the following: communicating the PDU from the DU of the IAB node to the MT of the IAB node.

6. An apparatus of an Integrated Access and Backhaul (IAB) node in an IAB network, the apparatus comprising:
    one or more processors configured to:
        decode, at a distributed unit (DU) of the IAB node, a buffer status report (BSR) received from one of a user equipment (UE) or a child IAB node, wherein the BSR is associated with the UE;
        encode, at a mobile terminal (MT) of the IAB node, a scheduling request (SR) for transmission to a parent IAB node or an IAB donor triggered by receipt of the BSR, wherein the SR is transmitted prior to a receipt of a protocol data unit (PDU) at the DU of the IAB node;
        decode, at the MT of the IAB node, a first uplink grant received from the parent IAB node or the IAB donor; and
        encode, at the MT of the IAB node, a predictive buffer status report (pBSR) for transmission to the parent IAB node or the IAB donor using the first uplink grant.

7. The apparatus of claim 6, wherein the one or more processors are further to:
    decode, at the MT of the IAB node, a second uplink grant received from the parent IAB node or the IAB donor;
    decode, at the DU of the IAB node, the PDU received the UE or the child IAB node, wherein the PDU at the IAB node is received after the pBSR is transmitted to the parent IAB node or the IAB donor; and
    encode, at the MT of the IAB node, the PDU for transmission to the parent IAB node or the IAB donor using the second uplink grant.

8. The apparatus of claim 7, wherein the one or more processors are further to: encode the PDU for transmission after reception of the PDU without delay based on the second uplink grant already received at the IAB node.

9. The apparatus of claim 7, wherein the one or more processors are further to: communicate, in response to receipt of the BSR, an indication of data arrival from the DU of the IAB node to the MT of the IAB node, wherein the indication of data arrival includes a size of expected data in a UE buffer.

10. The apparatus of claim 6, wherein the one or more processors are further to: communicate the PDU from the DU of the IAB node to the MT of the IAB node.

11. A method for operating an Integrated Access and Backhaul (IAB) node in an IAB network, the method comprising:
    decoding, at a distributed unit (DU) of the IAB node, a buffer status report (BSR) received from one of a user equipment (UE) or a child IAB node, wherein the BSR is associated with the UE;
    encoding, at a mobile terminal (MT) of the IAB node, a scheduling request (SR) for transmission to a parent IAB node or an IAB donor triggered by receipt of the BSR, wherein the SR is transmitted prior to a receipt of a protocol data unit (PDU) at the DU of the IAB node;
    decoding, at the MT of the IAB node, a first uplink grant received from the parent IAB node or the IAB donor; and
    encoding, at the MT of the IAB node, a predictive buffer status report (pBSR) for transmission to the parent IAB node or the IAB donor using the first uplink grant.

12. The method of claim 11, further comprising:
    decoding, at the MT of the IAB node, a second uplink grant received from the parent IAB node or the IAB donor;
    decoding, at the DU of the IAB node, the PDU received the UE or the child IAB node, wherein the PDU at the IAB node is received after the pBSR is transmitted to the parent IAB node or the IAB donor; and
    encoding, at the MT of the IAB node, the PDU for transmission to the parent IAB node or the IAB donor using the second uplink grant.

13. The method of claim 12, further comprising: encoding the PDU for transmission after reception of the PDU without delay based on the second uplink grant already received at the IAB node.

14. The method of claim 12, further comprising: communicating, in response to receipt of the BSR, an indication of data arrival from the DU of the IAB node to the MT of the IAB node, wherein the indication of data arrival includes a size of expected data in a UE buffer.

15. The method of claim 11, further comprising: communicating the PDU from the DU of the IAB node to the MT of the IAB node.

\* \* \* \* \*